United States Patent [19]

Bakermans

[11] Patent Number: 4,493,147

[45] Date of Patent: Jan. 15, 1985

[54] APPARATUS FOR FABRICATION OF A CROSSOVER WIRE HARNESS

[75] Inventor: Johannes C. W. Bakermans, Harrisburg, Pa.

[73] Assignee: AMP Incorporated, Harrisburg, Pa.

[21] Appl. No.: 432,211

[22] Filed: Oct. 1, 1982

[51] Int. Cl.³ .......................... H01R 43/04; B23P 19/00

[52] U.S. Cl. .......................................... 29/861; 29/748

[58] Field of Search .............. 29/749, 748, 759, 564.4, 29/857, 861

[56] References Cited

U.S. PATENT DOCUMENTS

| | | | |
|---|---|---|---|
| 3,866,292 | 2/1975 | Tucci | 29/749 X |
| 3,886,641 | 6/1975 | Davis | 29/759 X |
| 4,043,017 | 8/1977 | Folk et al. | 29/749 |
| 4,045,034 | 8/1977 | Svcheski et al. | 29/747 |
| 4,098,710 | 9/1977 | Nijman | 29/749 X |
| 4,109,370 | 8/1978 | Quigley | 29/749 X |
| 4,159,158 | 6/1979 | Weidler | 339/97 P |
| 4,375,719 | 3/1983 | Kent | 29/759 X |

*Primary Examiner*—Howard N. Goldberg
*Assistant Examiner*—Carl J. Arbes
*Attorney, Agent, or Firm*—Gerald K. Kita; Donald M. Boles

[57] ABSTRACT

Apparatus is disclosed for fabricating an electrical crossover wire harness, the apparatus including, a wire holder, a known wire shuttle for feeding wires to the wire holder, a pressure plate for guiding and inserting the wires into the wire holder, a carriage for mounting and transporting an electrical connector relative to the wire holder a wire stuffer for transferring selected wires into selected wire positions of the connector assembly, and the wire holder holding wires elevated from the connector assembly and the wires ,previously transferred thereto.

9 Claims, 17 Drawing Figures

Fig. 5
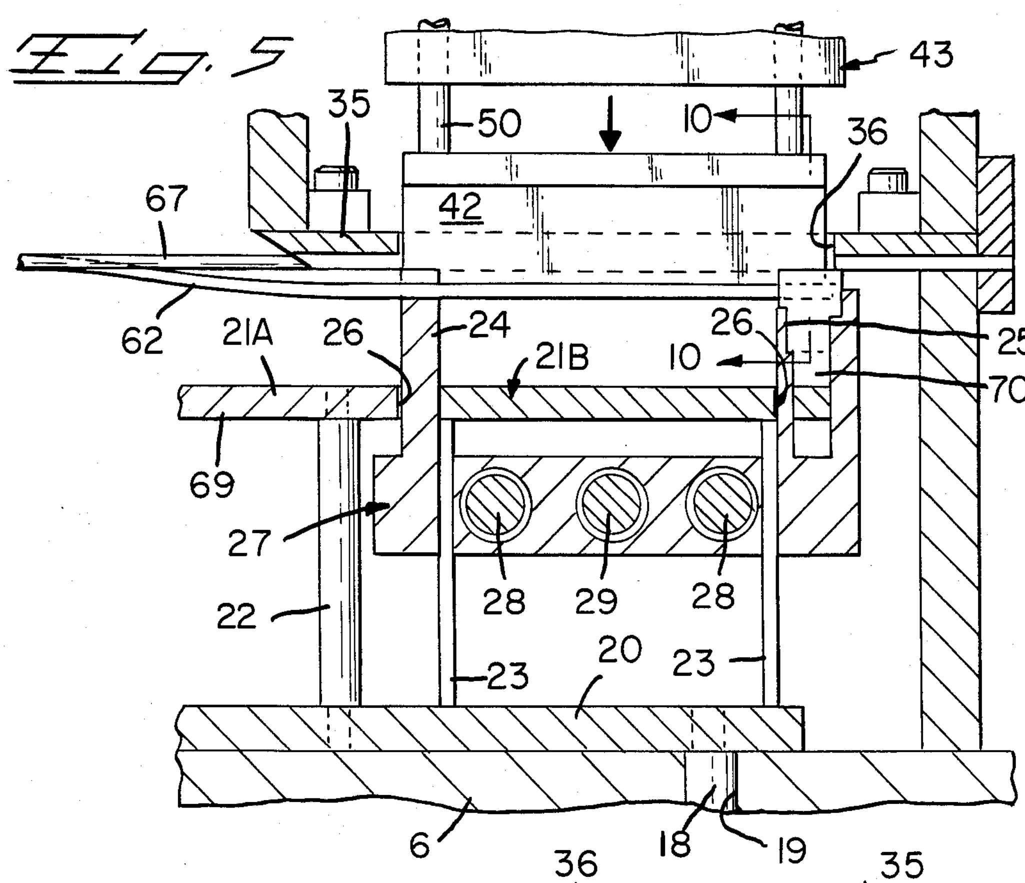
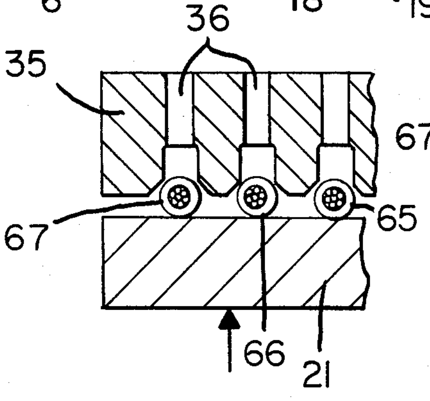
Fig. 6
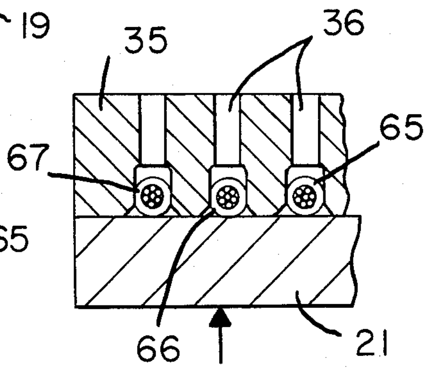
Fig. 7
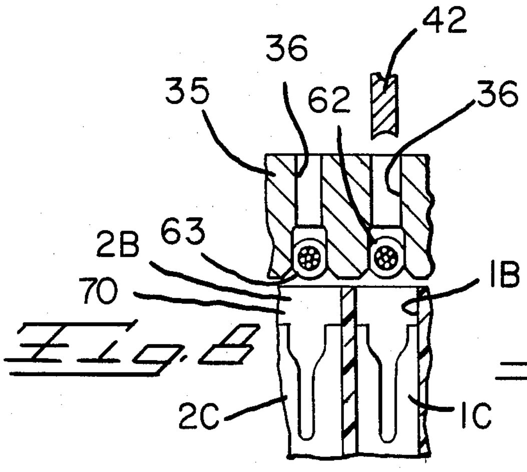
Fig. 8
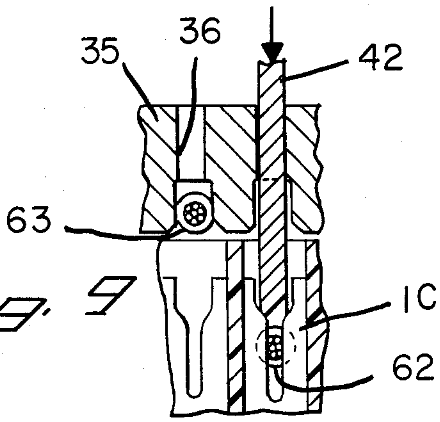
Fig. 9

Fig. 10
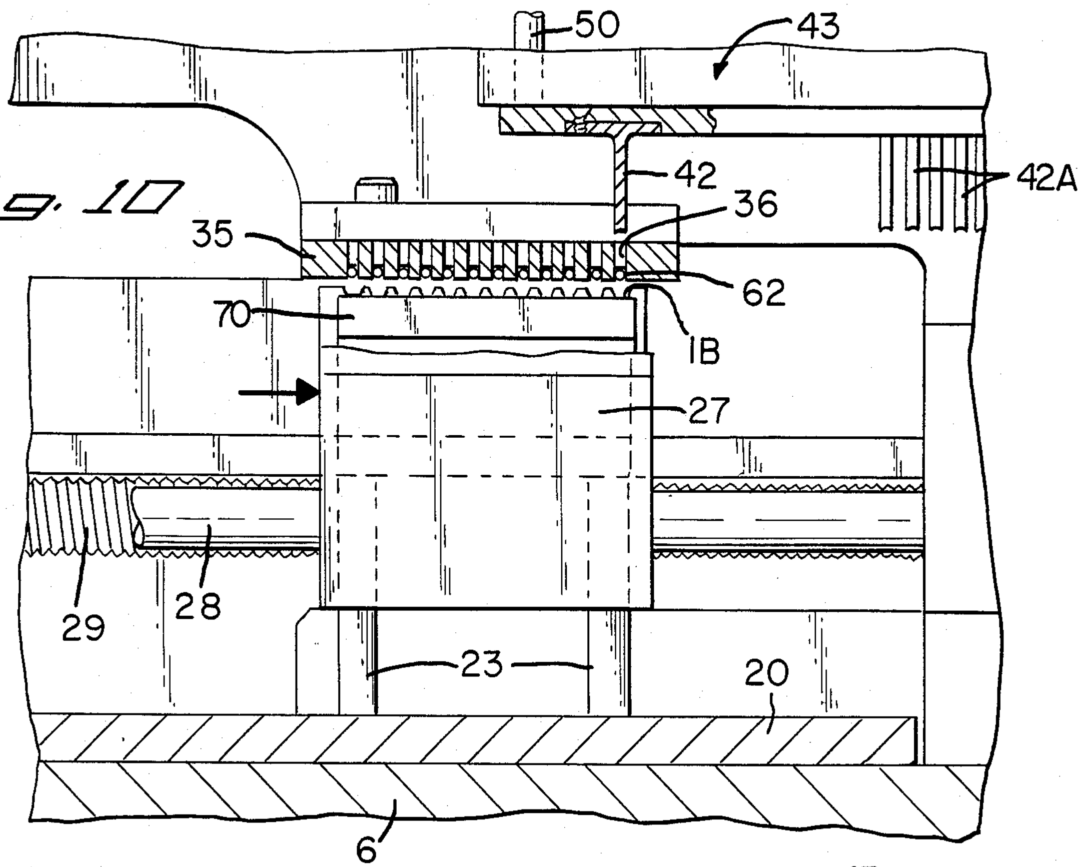
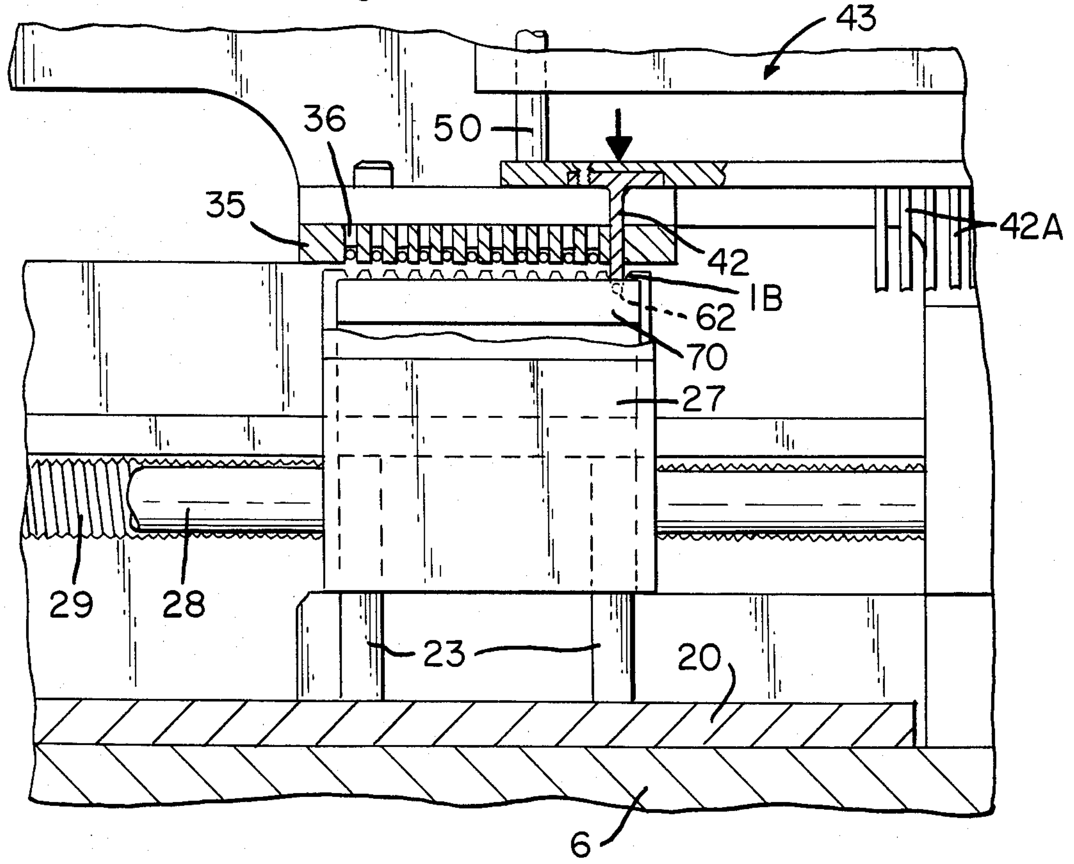
Fig. 11

APPARATUS FOR FABRICATION OF A CROSSOVER WIRE HARNESS

The invention relates to apparatus that fabricates an electrical harness in which electrical connector assemblies are secured along outstretched electrical wires, and selected wires cross over one another, and extend toward and into selected wire positions in the connector assemblies.

Apparatus is known from U.S. Pat. No. 4,043,017 for fabricating an electrical harness, in which electrical connector assemblies are secured along outstretched electrical wires. The known apparatus utilized two, spaced apart wire insertion mechanisms, each holding a connector assembly known, for example, in U.S. Pat. No. 4,159,158. The known apparatus extends the wires between, the connector assemblies and inserts the wires into, counterpart wire positions within respective connector assemblies. Electrical terminals at the counterpart wire positions are of the insulation displacement type that become connected electrically to the wires merely upon insertion of the wires into the terminals. The counterpart wire positions of each connector assembly are in matched alignment with the counterpart wire positions of each other connector assembly, so that the wires extend parallel to one another from the counterpart wire positions of one connector to those of another. The known apparatus inserts the parallel wires into all the wire positions common to a single connector assembly.

It is desirable to provide an electrical harness in which selected wires, instead of extending parallel one another, cross over one another as they extend between connector assemblies. This type of harness is named a crossover wire harness. The known apparatus of U.S. Pat. No. 4,043,017 must provide a first wire insertion mechanism for inserting a limited number of wires into a connector assembly, then provide a duplicate wire insertion mechanism that inserts crossover wires into the same connector assembly. Duplication of mechanisms increases both the cost and complexity of the apparatus.

The apparatus of the invention provides an individual wire insertion station capable of assembling either crossover wires or non-crossover wires into an associated connector assembly. The invention requires a single wire holder that holds the wires horizontally of their lengths, initially without crossing over one another so that they may droop under the action of gravity without entangling. A connector assembly is transported under the wire holder to align the wire positions of the connector assembly with the wires held by the wire holder. The wires are transferred at different times from the wire holder into the associated wire positions. The wire holder also holds corresponding wires elevated in respect to the connector assembly and the wires previously transferred thereto, to avoid entangling of the elevated wires with the connected wires during transport of the connector assembly relative to the wire holder.

The advantage of the invention resides in the apparatus having an individual wire insertion mechanism for assembling either crossover wires or non-crossover wires in a connector assembly of a wire harness.

Another advantage of the invention resides in apparatus for assembling wires in a crossover wire harness, wherein a wire holder holds wires without tangling, a wire stuffer transfers the wires from the wire holder into selected wire positions within a connector assembly, an indexing means transports the connector assembly relative to the wire holder, and the wire holder holds the wires elevated in respect to the connector assembly and the wires previously transferred thereto, to avoid wire entanglement.

An understanding of the invention will be obtained by way of example from the description accompanying the drawings in which;

FIG. 5 is a view similar to FIG. 4 and showing transfer of a wire from the wire holder into a connector assembly;

FIG. 6 is an enlarged fragmentary view in section taken along the line 6—6 of FIG. 3 illustrating the positions of a wire holder and a pressure plate during initial receipt of wires in the wire holder;

FIG. 7 is a view similar to FIG. 6 and taken along the line 7—7 of FIG. 4;

FIG. 8 is a view similar to FIG. 7, showing a connector assembly mounted below the wire holder;

FIG. 9 is a view similar to FIG. 8, illustrating a wire stuffer transferring a wire from the wire holder into the connector assembly;

FIG. 10 is a fragmentary, enlarged, side elevation view of the wire stuffer, the wire holder and the connector assembly prior to wire transfer;

FIG. 11 is a view similar to FIG. 10 showing the wire stuffer transferring a wire from the wire holder to the connector assembly;

Figure 1:
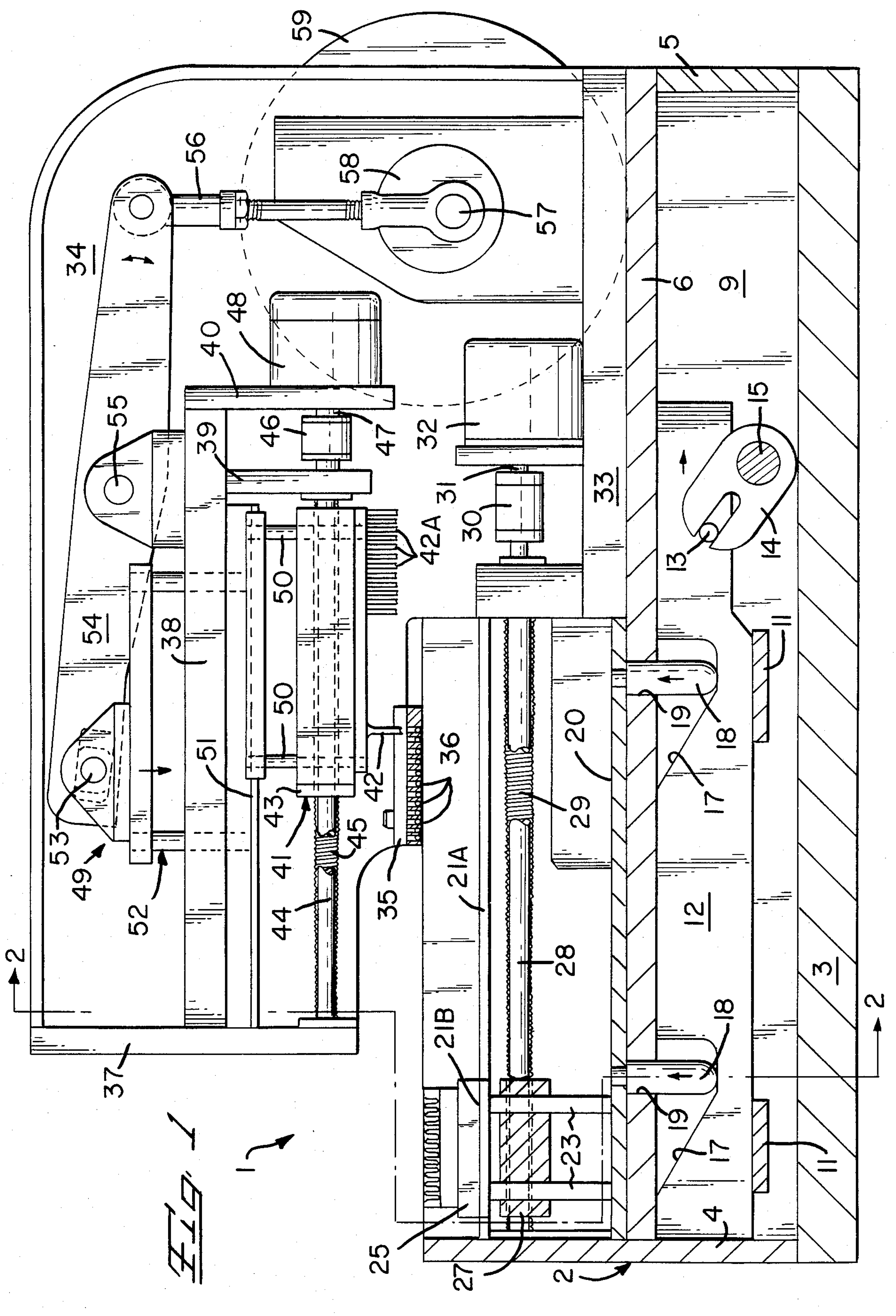
FIG. 1 is a side elevation view of the apparatus according to the invention with parts cut away and with parts in section.
Figure 2:
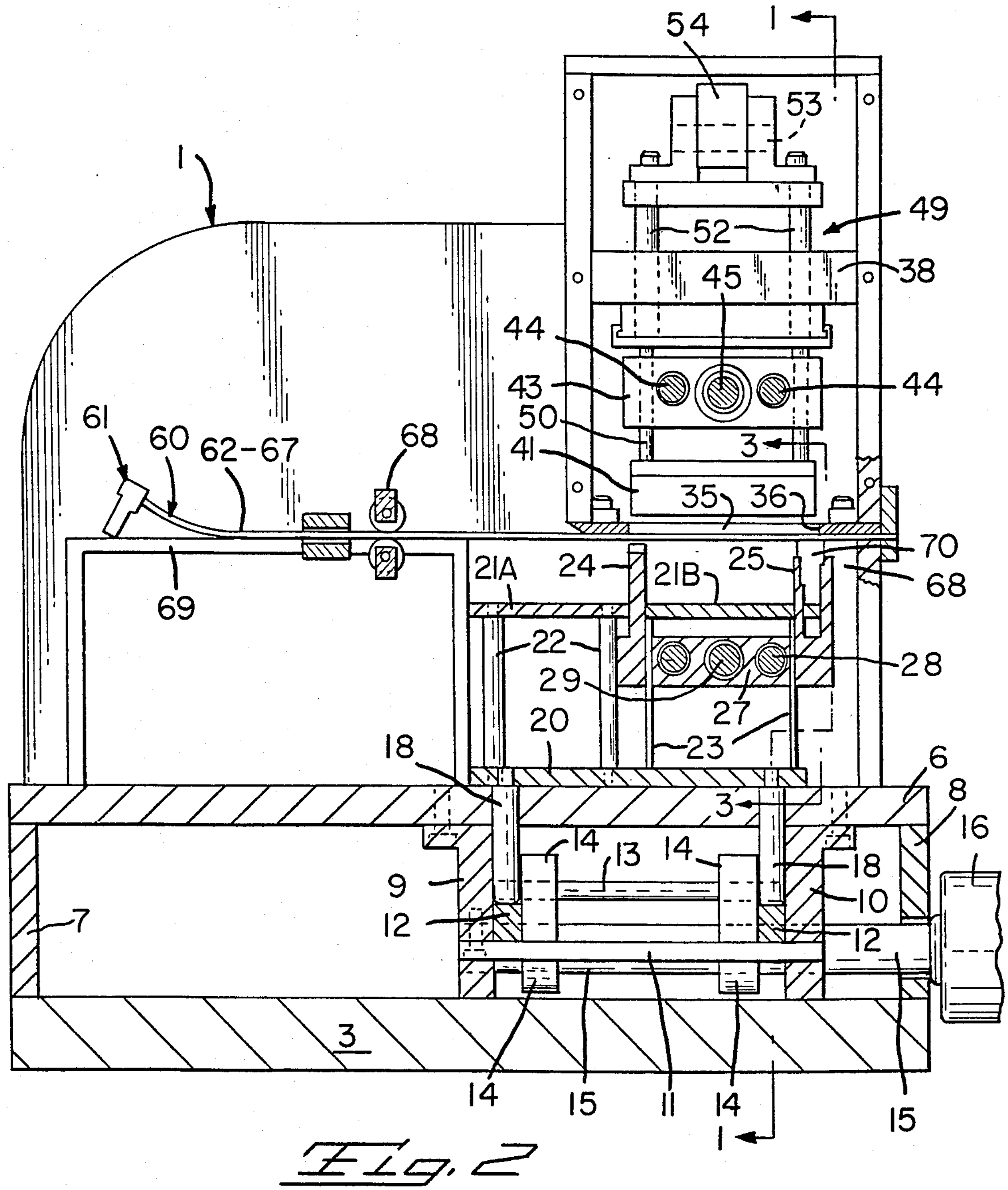
FIG. 2 is a front elevation view of the apparatus shown in section taken along the line 2—2 of FIG. 1.

With reference to FIGS. 1 and 2, the apparatus 1 of the invention includes a frame 1 comprising several frame members, including a base 3, external walls 4, 5, and a table 6 supported by the walls 4 and 5. FIG. 2 shows the table 6 supported also by external walls 7, 8 and further by internal walls 9, 10. A pair of support plates 11, 11 are carried by and bridge between the walls 9, 10. A pair of rams 12, 12 are slidably supported on the plates 11, 11. A pin 13 connects the rams 12, 12 and is received between the arms of respective yokes 14, 14 mounted on a shaft 15, in turn rotatably mounted by the walls 9, 10. A known stepping motor 16 on the shaft 15 will rotate the shaft 15, pivot the yokes 14 and slidably reciprocate the rams 12, 12. Each ram 12, 12 has inclined cam surfaces 17, 17. Pins 18, 18 impinge respective cam surfaces 17, 17 and pass through respective bores 19, 19 in the table 6. The pins 18, 18 are secured in a bottom plate 20.

FIGS. 1–5 illustrate that the bottom plate 20 is raised or lowered by the pins 18, 18, in turn, raised by the cam surfaces 17, 17 (when the rams 12, 12 are reciprocated left to right as shown in FIG. 1). A planar pressure plate 21 (FIGS. 2 and 3) has a first portion 21A supported on and secured to legs 22, in turn, secured to the bottom plate 20. A second portion 21B of the pressure plate 21 is secured to and supported by rectangular legs 23. The legs 23 slidably impinge the bottom plate 20 to support the portion 21B coplanar with the portion 21A, and to permit slidable traverse of the portion 21B alongside and coplanar with the portion 21A. A column 24 and a bifurcated column 25 project through clearances 26 of the pressure plate 21 and slidably support corresponding adjacent legs 23 during raising or lowering of the legs 23 together with the bottom plate 20.

FIGS. 1–5 illustrate generally at 27, a carriage, in the form of a block that carries the columns 24, 25, and that is slidably supported along horizontal rails 28 supported by the frame 2. The carriage 27 is threadably mounted on a horizontal lead screw 29 that is connected by a known coupling 30 to an output shaft 31 of a known electrical stepping motor 32. The motor 32 is mounted on a plate 33 that is part of the frame 2. The carriage slidably supports the legs 23 during raising or lowering of the bottom plate 20. Further, activation of the motor 32 will turn the lead screw 29 so that the carriage 27 will traverse along the lead screw and the rails 28. The pressure plate portion 21B will accompany the carriage 27 and will traverse alongside the pressure plate portion 21A. The legs 23 will accompany the carriage 27 and will slidably traverse along the surface of the bottom plate 20.

FIG. 1 shows a vertical panel 34 that is part of the frame 2 and is mounted on the plate 33. The panel 34 carries a wire holder 35 having a plurality of parallel, elongated slots 36. The slots 36 overlie the path of traverse of the carriage 27. The frame 2 includes flanges 37, 38, 39 and 40, each mounted on the panel 34. A wire stuffer is generally shown at 41 and includes a reciprocating blade 42 mounted on a carriage 43. The carriage is slidably mounted along parallel rails 44, 44 (FIG. 2) carried by the flanges 37, 39. The carriage 43 is threadably mounted along a lead screw 45 rotatably carried by the flanges 37, 39. The lead screw 45 is connected by a known coupling 46 to an output shaft 47 of a known electrical stepping motor 48. The lead screw 45 is rotated by the motor 48 to index the carriage 43 and position the associated stuffer blade 42 in selected alignment with each slot 36.

A mechanism shown generally at 49 reciprocates the stuffer blade 42 into and out of an associated aligned slot 36. The mechanism 49 includes a polygon shaped ram 50 that is slidably received by the carriage 43 and that carries the stuffer blade 42. The ram 50 is slidably mounted along a track 51 on a polygon shaped link 52, also part of the mechanism 49. The link 52 is pivotally connected by a pin 53 to a lever 54, that is pivotally mounted by a pivot connection 55 to the flange 38. The other end of the lever is connected pivotally by a link 56, adjustable in length, to a shaft 57. A known spring wrap clutch 58 couples the shaft 57 eccentrically to the output shaft (not shown) of an electric motor 59. According to a known operation, while the motor 59 turns its output shaft, the clutch 58 permits one orbital revolution of the eccentric mounted shaft 57. The orbital revolution causes operation of the mechanism 49 in one cycle, to reciprocate the stuffer blade 42 first into and then out of the associated, aligned slot 36 of the wire holder 35.

FIG. 1 further shows an array of auxiliary stuffer blades 42A carried by the ram 50. The carriage 43 is indexed to position the stuffer blades 42A in alignment respectively with all the slots 36 of the wire holder 35. Then, upon one cycle of the mechanism 49, the stuffer blades 42A are reciprocated into and out of the aligned, associated slots 36.

Operation of the apparatus 1 is described with reference to FIG. 2, in conjunction with FIGS. 13–17. A wire harness 60, is shown as it is being assembled by the apparatus 1, and includes a first connector assembly 61 having its counterpart wire positions numbered 1A–6A, respectively. Insulated electrical wires 62–67 have been inserted into these respective, counterpart wire positions and therein are electrically connected with electrical terminals (not shown). The connector assembly 61 the terminals thereof and the manner of electrically connecting the wires to the terminals are known from U.S. Pat. No. 4,159,158. There is known in U.S. Pat. No. 4,043,017, apparatus for feeding the wires 62–67 parallel to one another and for inserting these wires into a connector assembly such as the connector assembly 61. This known apparatus includes a wire feed shuttle 68 (FIG. 2) adapted for mounting on a table 69 of the apparatus 1.

Figure 3:
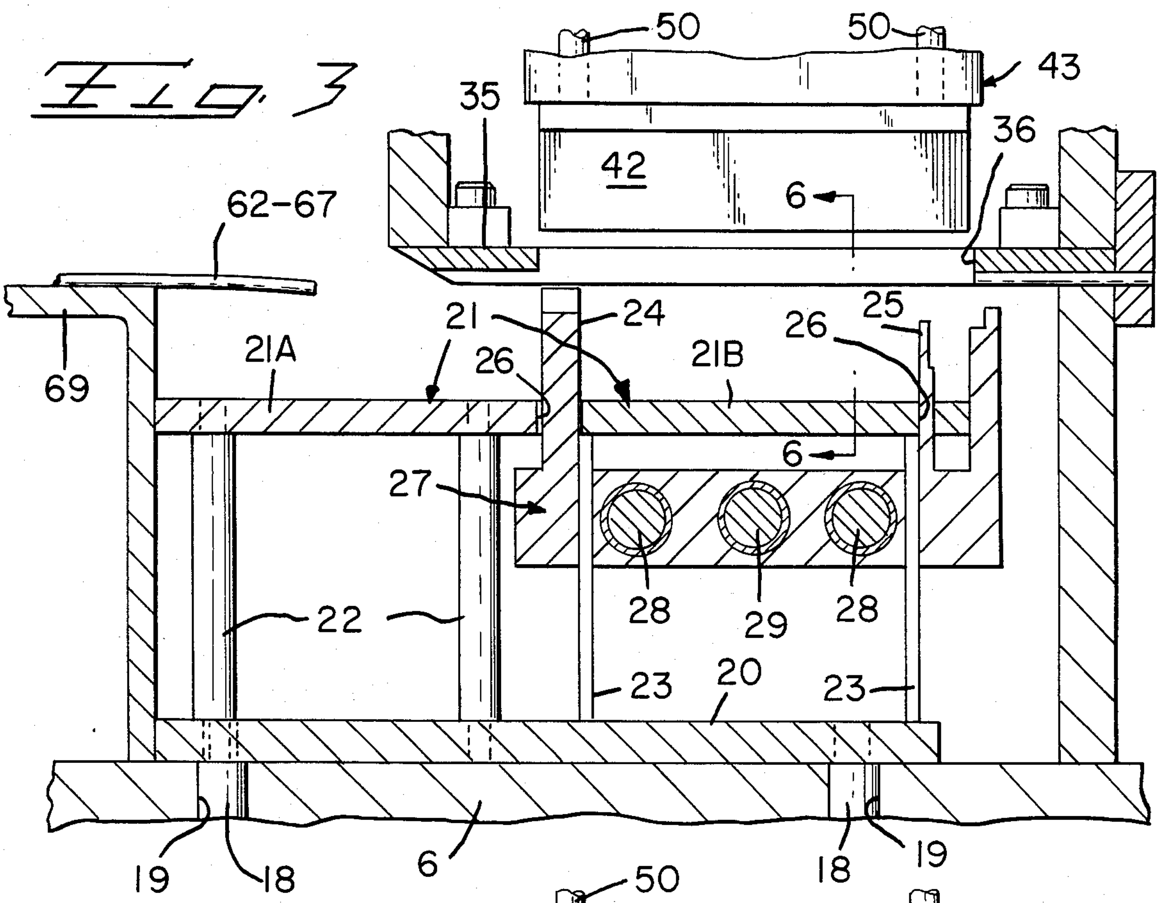
FIG. 3 is a fragmentary view in section taken along the line 1—1 of FIG. 2 and illustrating a wire holder about to receive wires.
Figure 4:
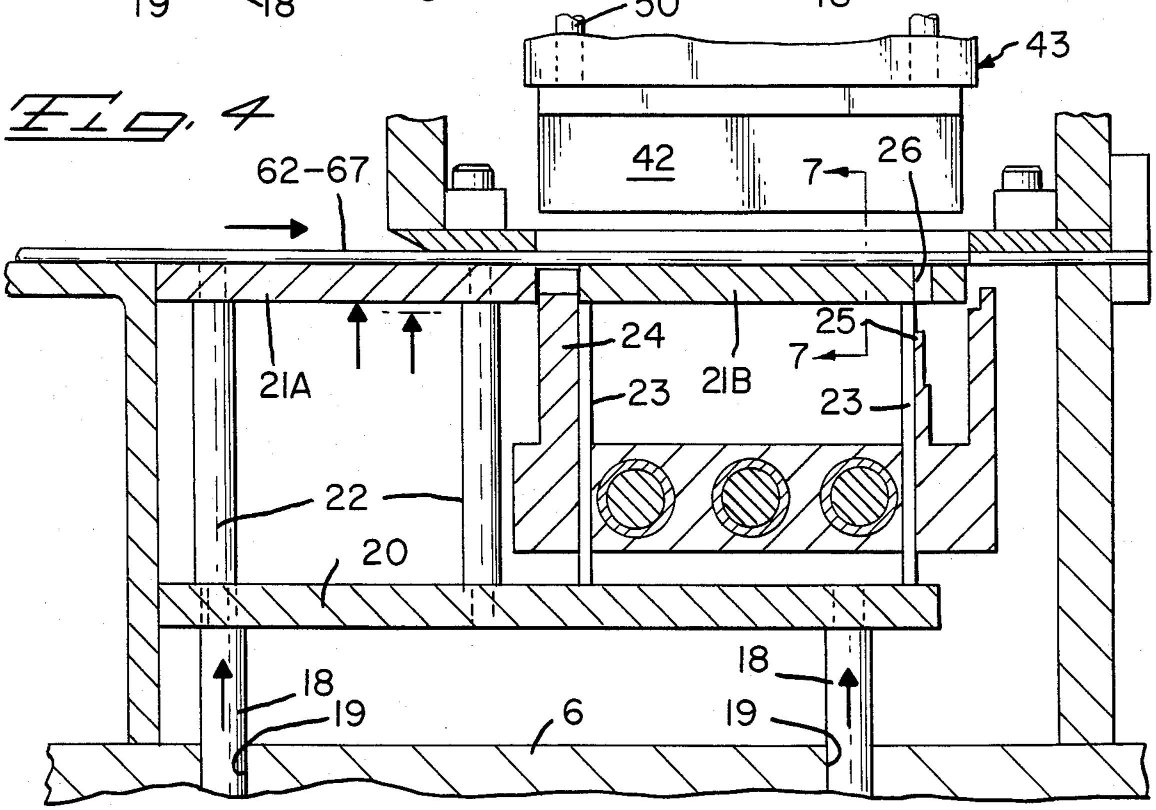
FIG. 4 is a view similar to FIG. 3 and illustrating full receipt of wires in the wire holder.

As shown in FIGS. 3 and 6, the feed shuttle 68 projects the wires 62–67 along the table 69 toward and in alignment with respective slots 36 of the wire holder 35. The pressure plate 21 is raised by operating the stepping motor 16 to a first position shown in FIG. 6 to support the wires 62–67 partially within and along the flared entryways lengthwise of the slots 36. As shown in FIGS. 4 and 7, the pressure plate 21 is raised by rotation of the stepping motor 16 to a second position, urging the wires 62–67 into respective slots 36; the lengths of the wires being retained longitudinally along the slots 36 by friction fit therein.

Figure 12:
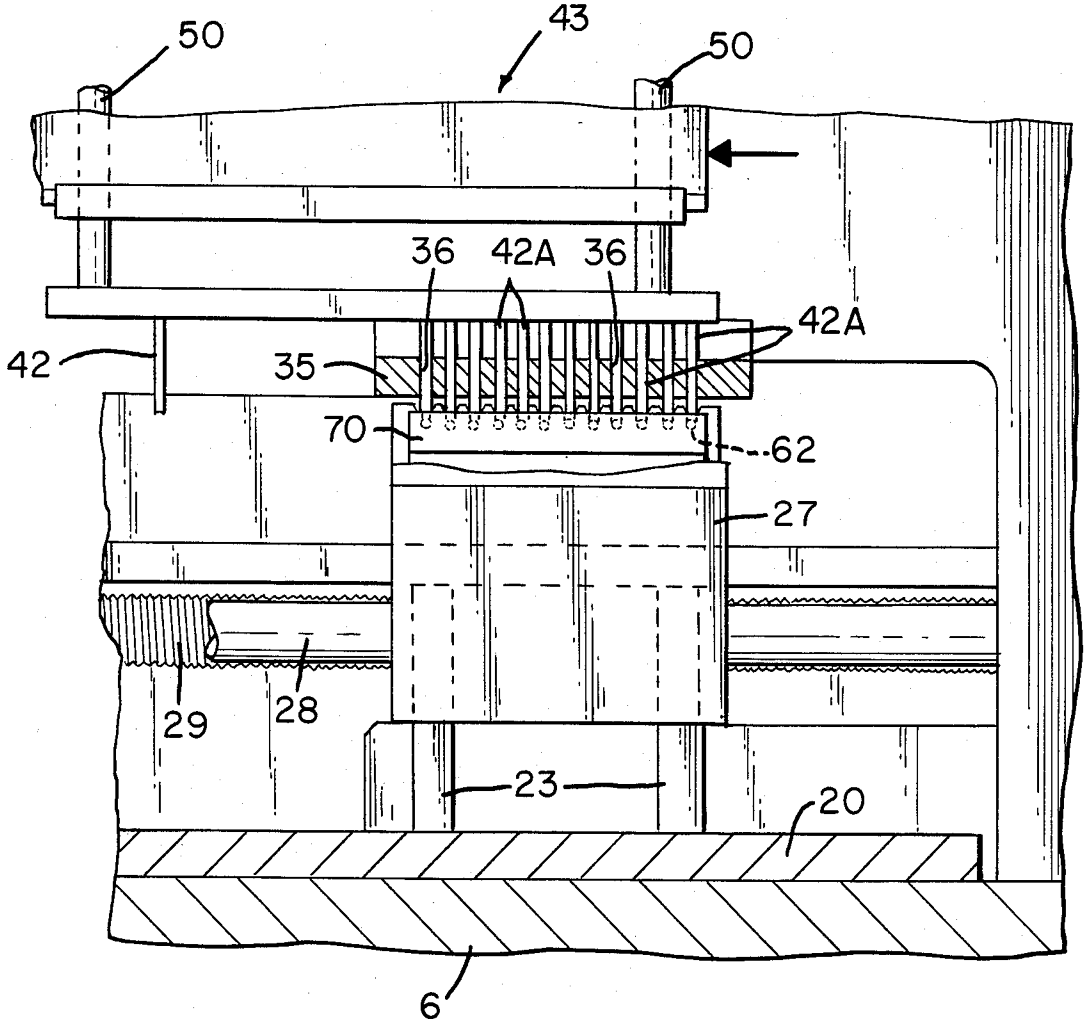
FIG. 12 is a view similar to FIG. 11 illustrating an alternate wire stuffer transferring all the wires from the wire holder to the connector assembly.
Figure 13:
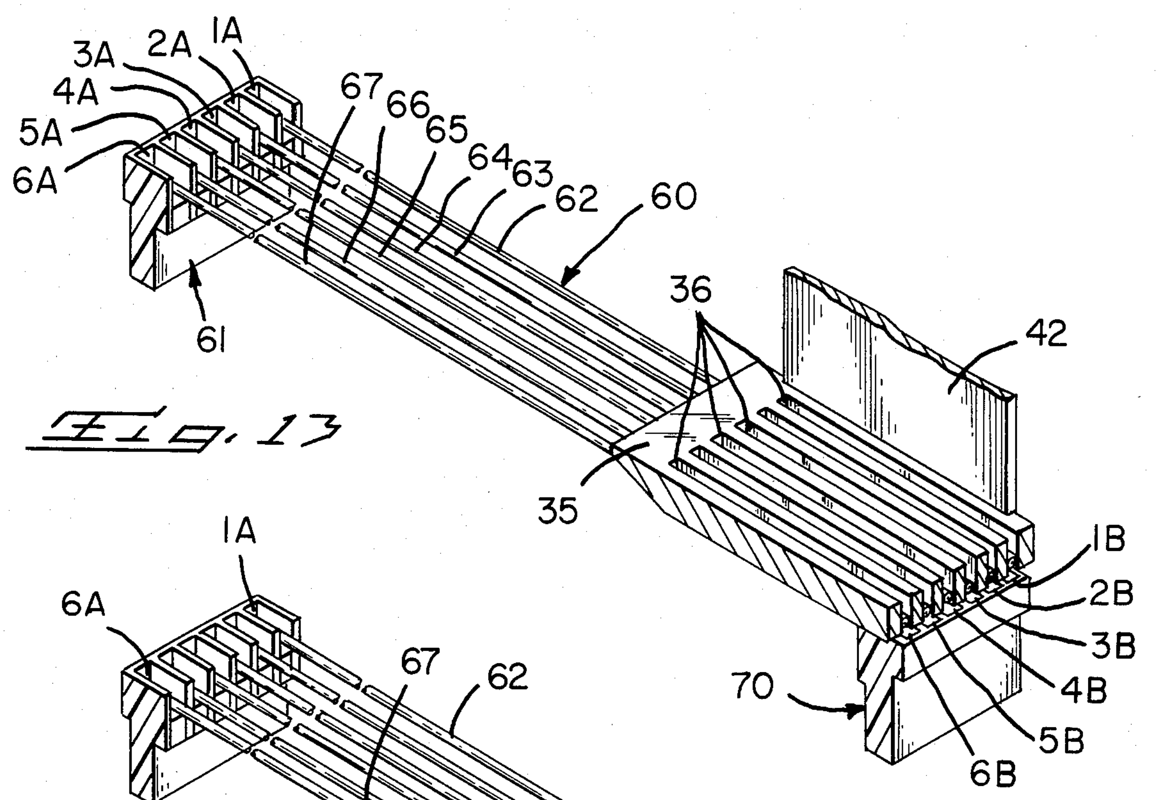
FIGS. 13–17 are schematic perspective views and a diagrammatic view illustrating various steps during fabrication of a crossover wire harness.
Figure 14:
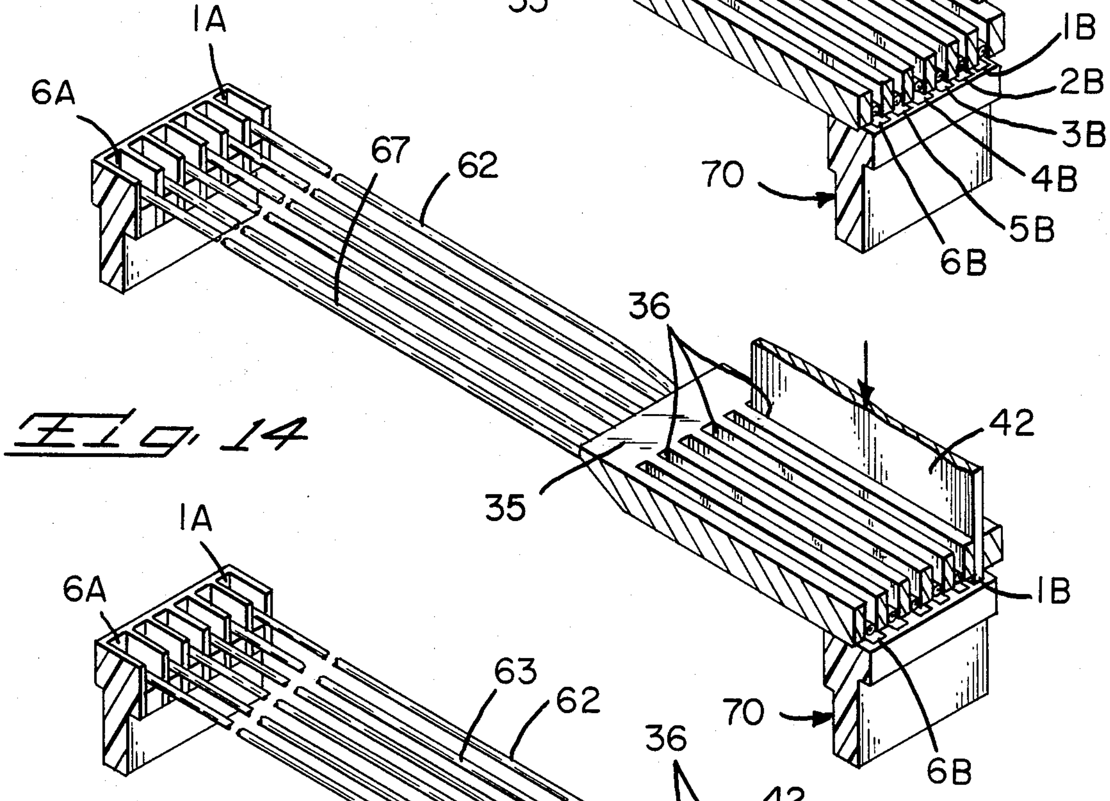
Figure 15:
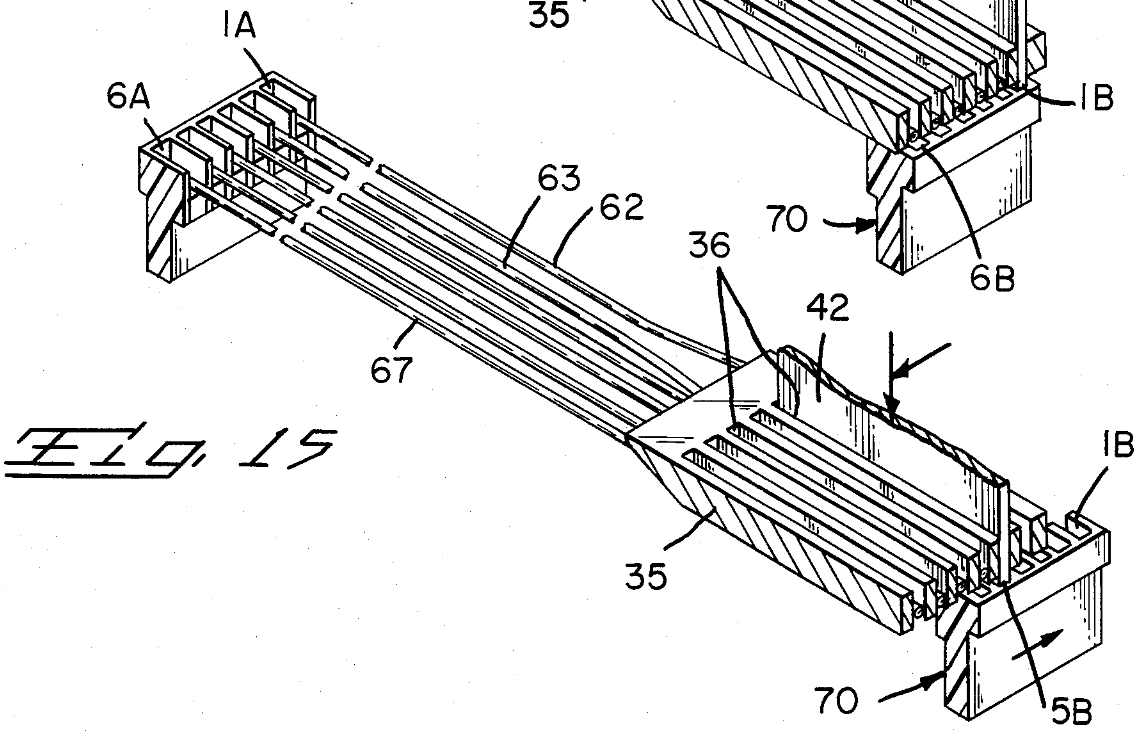
Figure 16:
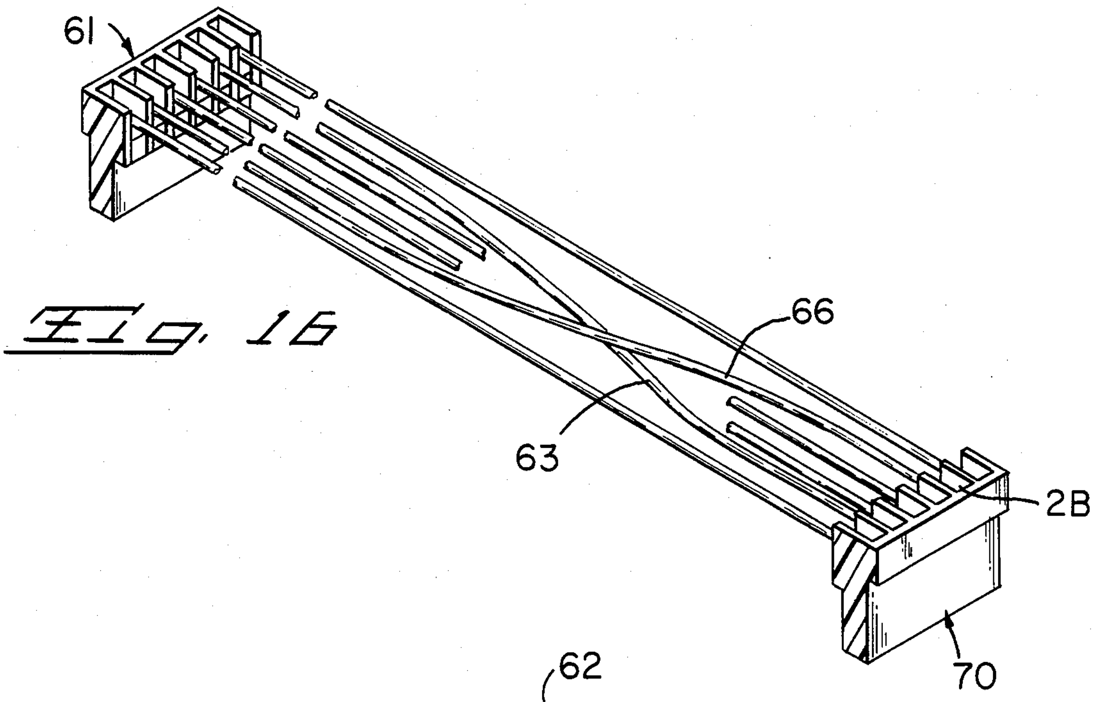
Figure 17:
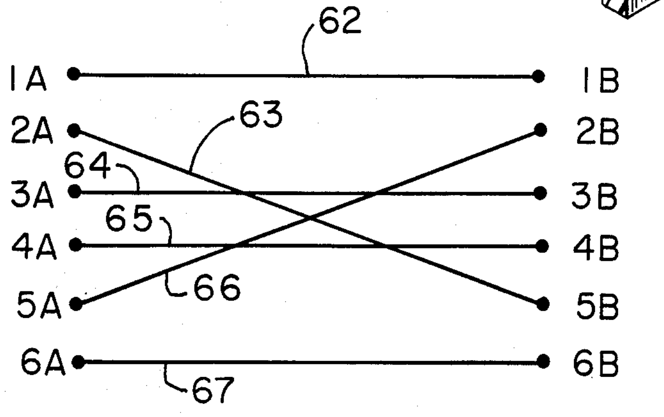

The pressure plate then is lowered by reverse rotation of the stepping motor 16 to a third position shown in FIGS. 1, 2, 3, 5, 8, 9, and 10. A connector assembly 70, similar to the connector assembly 61, is mounted on the pressure plate portion 21B and is held in place by the bifurcated column 25. The connector assembly 70 has counterpart wire positions 1B–6B, and is indexed by the carriage to position these wire positions in desired matched alignment with corresponding slots 36 of the wire holder 35. For example, FIGS. 8, 9, 10, 11, 13 and 14 show the wire position 1B aligned with the slot 36 which retains the wire 62. The stuffer blade 42 is aligned with the same slot by suitable indexing of the carriage 43. The mechanism 49 is cycled to reciprocate the stuffer blade 42 into and out of the slot, (FIG. 11) dislodging and transferring the wire from the slot into the counterpart wire position 1B of the connector assembly 70, to establish therein an electrical connection with a known electrical terminal, not shown, of the connector assembly 61. For example, it may be desirable to assemble the wire 63 (FIG. 15) in the counterpart wire position 5B of the connector assembly 70. The wire position 5B must be indexed by the carriage 27 (FIG. 1) into matched alignment with the slot 36 that retains the wire 63. Also, the stuffer blade 42 must be indexed by the carriage 43 into alignment with the same slot. The mechanism 49 is cycled to reciprocate the stuffer blade 42 and transfer the wire 63 from the slot 36 to the counterpart wire position 5B. In similar fashion, the counterpart wire position 2B and the stuffer blade 42 may be aligned with the slot 36 that retains the wire 66. Cycling of the mechanism 49 will transfer the wire 66 into the wire position 2B. To complete the assembly, reference is made to FIG. 12 that shows an array of stuffer blades 42A capable of being indexed by the carriage 43 into alignment respectively, with all the slots 36. The connector assembly 70 is indexed by the carriage 27 to align the empty wire positions 1B–6B in matched alignment, respectively, with the wires remaining in the slots 36. Upon cycling of the mechanism 49, all the wires yet remaining in the slots 36 will be transferred into associated empty wire positions 1B–6B that previously have not received any of the wires 62–67. The completed assembly 60 is shown and represented in FIGS. 16 and 17 respectively. The wires 62–67 cross over one another to extend to desired counterpart wire positions in the connector assemblies 61 and 70. It is important to recognize that the wire holder 35 holds the wires initially without crossing one another as they project horizontally of their lengths from the feed rollers 68, 68, so that the unheld portions of the wires may droop under the action of gravity without entangling. Further, the held wires are elevated in respect to the wires previously transferred to the connector assembly to avoid entanglement of the wires during transport of the carriage 27 together with the connector assembly 70 relative to the wire holder 35. Thereby, the wires may cross over one another, without entanglement, as the connector assembly 70 is transported relative to the wire holder 35.

Other modifications and embodiments of the invention are intended to be covered by the spirit and scope of the appended claims. For example, the wire stuffer blades 42, 42A may vary in number to accommodate connector assemblies having different numbers of counterpart wire positions. The stepping motors may be operated by manually actuated switches or by known electrical sequence control circuits that operate faster than manual switching operations.

What is claimed:

1. A method for fabricating a crossover wire harness comprising the steps of: feeding a plurality of electrical wires to a wire holder, holding the wires in the wire holder horizontally of their lengths without the wires crossing over one another, transporting an electrical connector assembly relative to the wire holder to align a respective wire position of the connector assembly with a selected held wire, transferring the selected held wire from the wire holder into the aligned wire position of the connector assembly, and holding the remaining wires by the wire holder elevated in respect to the connector assembly and the wires previously transferred thereto during transport of the connector assembly relative to the wire holder.

2. The method according to claim 1, and further including the steps of: transferring selected wires individually from the wire holder into respective wire positions of the connector assembly, transporting the connector assembly to align the empty wire positions thereof into alignment with the remaining wires held by the wire holder, and transferring all the remaining wires from the wire holder to the empty wire positions of the connector assembly.

3. Apparatus for fabricating an electrical wire haness in which electrical connector assemblies having electrical terminals therein are secured along outstretched electrical wires, wherein the apparatus comprises:

a frame;

connector mounting means on the frame for mounting a connector assembly having counterpart wire positions;

a wire holder on the frame for positioning electrical wires in selected alignment with the counterpart wire positions;

wire feeding means supported by the frame for feeding electrical wires to the wire holder;

wire stuffer means supported by the frame for engaging and transferring the wires into the counterpart wire positions wherein electrical terminals receive the transferred wires and establish electrical connections thereto;

wherein said apparatus is characterized in that;

the wire holder and the connector mounting means are transportable relative to each other so as to align a selected, counterpart wire position of the connector assembly with a selected wire which is being held in the wire holder; and the wire holder holds corresponding wires horizontally of their lengths in spaced apart relationship to the connector mounting means during relative transport of the wire holder and the connector mounting means.

4. The apparatus according to claim 3, further characterized in that; the wire stuffer includes a wire engaging blade, indexing means to index the blade into alignment with a selected wire held by the wire holder, and a reciprocable ram adjacent that mounts the blade and that reciprocates the blade so as to engage and transport the selected wire from the wire holer to a corresponding counterpart wire position in the connector assembly.

5. The apparatus according to claim 4, further characterized in that; the wire stuffer includes a group of additional stuffer blades mounted on the ram for reciprocation therewith, such blades being equal in number to the wires held by the wire holder prior to transfer of any such wires to a connector assembly on the connector mounting means, and the indexing means being constructed for transporting the additional stuffer blades along the ram into alignment with such wires held by the wire holder.

6. Apparatus for fabricating a crossover wire harness, comprising:

a frame;

a wire holder on the frame for holding a plurality of wires;

first means for feeding said wires to the wire holder;

a carriage disposed on the frame for mounting and transporting an electrical connector assembly relative to the wire holder;

a wire stuffer supported by the frame for transport relative to the wire holder and for transferring respective wires from the wire holder to respective selected wire positions of the connector assembly;

indexing means disposed on the frame and mounting while the wire holder holds the associated wires in spaced apart relationship from the connector assembly and the wires previously transported thereto, during transport of the connector assembly by the carriage; and a linkage interconnecting device interconnecting the wire stuffer, the carriage, the connector assembly and the indexing means so as to operate in a desired sequence.

7. The apparatus according to claim 6, wherein the wire stuffer includes a single, wire engaging blade for transport into matched alignment with a respective selected wire held by the wire holder.

8. The apparatus according to claim 7, wherein the wire stuffer includes a group of wire engaging blades for transport into matched alignment with respective wires held by the wire holder and not previously transferred to the connector assembly.

9. Apparatus for fabricating an electrical wire harness in which electrical connector assemblies having electrical terminals therein are secured along outstretched electrical wires, wherein the apparatus comprises:

a frame;

connector mounting means on the frame for mounting a connector assembly having counterpart wire positions;

a wire holder on the frame having slots therein for positioning said electrical wires in alignment with the counterpart wire positions, said slots being parallel to said electrical wires;

wire feeding means supported by the frame for feeding electrical wires to the wire holder;

wire stuffer means supported by the frame for engaging and transferring the wires into the counterpart wire positions wherein electrical terminals receive the transferred wires and establish electrical connections thereto;

wherein said apparatus is characterized in that:

the wire holder is coupled to said connector mounting means by a linkage interconnection device so as to operate in a desired sequence such that they are transportable relative to each other thereby aligning a selected, counterpart wire position of the connector assembly with a selected wire which is being held in the wire holder; and the wire holder holds corresponding wires in said slots horizontally of their lengths in spaced apart relationship to the connector mounting means during relative transport of the wire holder and the connector mounting means.

* * * * *